United States Patent [19]
Bates et al.

[11] Patent Number: 5,959,646
[45] Date of Patent: Sep. 28, 1999

[54] METHOD OF PRINTING WITH AN INK JET PRINTER USING INDEPENDENT SHINGLING ON A RASTER BY RASTER BASIS

[75] Inventors: John Booth Bates; Robert Frederick Locasto, both of Lexington, Ky.

[73] Assignee: Lexmark International, Inc., Lexington, Ky.

[21] Appl. No.: 08/987,227

[22] Filed: Dec. 9, 1997

[51] Int. Cl.$^6$ .................................. B41J 2/21; B41J 29/38
[52] U.S. Cl. ..................................... 347/43; 347/9; 347/14
[58] Field of Search ................................. 347/41, 43, 9, 347/5, 14; 400/345, 555, 124.04

[56] References Cited

U.S. PATENT DOCUMENTS

| | | | |
|---|---|---|---|
| 5,600,353 | 2/1997 | Hickman et al. | 347/43 |
| 5,604,520 | 2/1997 | Matsubara et al. | 347/43 |
| 5,654,744 | 8/1997 | Nicoloff, Jr. et al. | 347/43 |

Primary Examiner—N. Le
Assistant Examiner—Thinh Nguyen
Attorney, Agent, or Firm—John J. McArdle

[57] ABSTRACT

A method of printing an image on a print medium uses an ink jet printer, with the print medium being movable in an advance direction in the printer. An image area defined on the print medium includes a plurality of rasters extending in a direction transverse to the advance direction. The plurality of rasters are arranged sequentially adjacent to each other in the advance direction. A printhead includes a first array of ink jetting orifices and a second array of ink jetting orifices. Each of the first array and second array are configured for jetting a respective color ink onto the print medium. A plurality of first interlace levels associated with the first array of ink jetting orifices and a plurality of second interlace levels associated with the second array of ink jetting orifices are assigned to the plurality of rasters. Each of the first and second interlace levels are associated with only one of the rasters. The print medium is printed on in the plurality of rasters using the first array of ink jetting orifices with the first interlace levels, and the second array of ink jetting orifices with the second interlace levels.

17 Claims, 5 Drawing Sheets

| # OF SCANS | PATTERN NAME | 8BIT PATTERN |
|---|---|---|
| 1 PASS | SHINGLE 100_1 | 1111 1111 |
| 2 PASS | SHINGLE 50_1 | 1010 1010 |
|  | SHINGLE 50_2 | 0101 0101 |
| 4 PASS | SHINGLE 25_1 | 1000 1000 |
|  | SHINGLE 25_2 | 0100 0100 |
|  | SHINGLE 25_3 | 0010 0010 |
|  | SHINGLE 25_4 | 0001 0001 |

| RASTER # | CYAN | MAGENTA | YELLOW |
|---|---|---|---|
| 1 | 4 PASS | 2 PASS | 1 PASS |
| 2 | 2 PASS | 1 PASS | 1 PASS |
| 3 | 1 PASS | 2 PASS | 4 PASS |
| 4 | 1 PASS | 1 PASS | 4 PASS |
| 5 | 2 PASS | 2 PASS | 1 PASS |
| 6 | 2 PASS | 1 PASS | 1 PASS |
| 7 | 2 PASS | 2 PASS | 1 PASS |
| 8 | 2 PASS | 1 PASS | 1 PASS |
| 9 | 1 PASS | 2 PASS | 2 PASS |
| 10 | 1 PASS | 1 PASS | 1 PASS |

Fig. 2

| # OF SCANS | PATTERN NAME | 8BIT PATTERN |
|---|---|---|
| 1 PASS | SHINGLE 100_1 | 1111 1111 |
| 2 PASS | SHINGLE 50_1 | 1010 1010 |
|  | SHINGLE 50_2 | 0101 0101 |
| 4 PASS | SHINGLE 25_1 | 1000 1000 |
|  | SHINGLE 25_2 | 0100 0100 |
|  | SHINGLE 25_3 | 0010 0010 |
|  | SHINGLE 25_4 | 0001 0001 |

Fig. 3

METHOD OF PRINTING WITH AN INK JET PRINTER USING INDEPENDENT SHINGLING ON A RASTER BY RASTER BASIS

BACKGROUND OF THE INVENTION

1. Field of the Invention

The present invention relates to ink jet printers, and, more particularly, to a method of shingled printing with a color ink jet printer.

2. Description of the Related Art.

Ink jet printers commonly include a printhead which is mounted on a carriage assembly. The carriage assembly is movable in a transverse direction, relative to an advance direction of a print medium such as paper. As the printhead is moved across the print medium during a particular pass of the carriage assembly, ink is selectively jetted from ink jetting orifices formed in the printhead and is deposited on the print medium at corresponding ink dot placement locations in the image area of the print medium. Since the printhead moves in a direction transverse (e.g., perpendicular) to the advance direction of the print medium, each ink jetting orifice passes in a linear manner over the print medium. The line associated with each ink jetting orifice which overlies the print medium is commonly referred to as a raster or raster line. A plurality of rasters which extend across the image area of the print medium are disposed vertically adjacent to each other in the advance direction of the print medium.

Multi-color ink jet printers typically include a printhead having a plurality of ink jetting orifices therein. The ink jetting orifices are segregated into different arrays of ink jetting orifices, with each array corresponding to the different color inks which are to be jetted onto the print medium. With a known tri-color printhead, a first array of ink jetting orifices is used for jetting yellow ink onto the print medium, a second array of ink jetting orifices is used for jetting magenta ink onto the print medium, and a third array of ink jetting orifices is used for jetting cyan ink onto the print medium. The first, second and third arrays of ink jetting orifices are sequentially arranged relative to the advance direction of the print medium. Associated with each ink jetting orifice in the three arrays of ink jetting orifices is a corresponding ink jetting heater. Actuation of a particular ink jetting heater causes the formation of a bubble within the ink disposed adjacent thereto and expels the ink from the associated ink jetting orifice. A host computer connected with the printer transmits raster information to the printer for selective actuation of the ink jetting heaters.

To render a full color image, the tri-color printhead is passed across a print medium such as paper in a horizontal direction perpendicular to the vertical direction of alignment of the orifices in the printhead. Between passes of the printhead, the print medium is moved in the advance direction. For a raster, or row of printed dots, which contains at least one of each of cyan, magenta and yellow dots, the color printhead must be passed at least three times, once passing to deposit any cyan dots present in the given raster, once passing to deposit any magenta dots, and once passing to deposit any yellow dots. Of course, for any pass of the color head all 48 color orifices can be used, depositing the cyan, magenta, and yellow inks at different raster locations. The most time efficient technique for depositing ink therefore causes the tri-color printhead to pass across each raster of the page at most three times.

With a conventional method of printing with a tri-color ink jet printer as described above, objectionable print artifacts may occur because of the sequencing and/or timing between the placement of the different color ink dots on the print medium. For example, print artifacts such as horizontal color/black banding or intercolor bleeding may occur.

One known solution to the problem of a color/black banding artifact is known as shingling or interlaced printing. For a 50% shingling mode (i.e., 2-pass or 50% interlace level), approximately 50% of the dots are placed on any given pass of the printhead. The candidate dots are selected according to a checkerboard pattern. The remaining 50% of the dots are placed on a subsequent pass of the printhead. For a raster which contains cyan, magenta, yellow, and black dots, the color printhead must be passed at least six times with a 50% shingling mode, twice depositing any cyan dots present in the given raster, twice depositing any magenta dots, and twice depositing any yellow dots.

When printing with an ink jet printer using a shingling method as described above, it is known to assign a particular interlace level to the tri-color printhead for use during printing on the print medium. For example, assuming that an image area corresponds to 16 rasters, it is known to assign a single interlace level for each of the cyan array of ink jetting orifices, magenta array of ink jetting orifices and yellow array of ink jetting orifices. It is also known to change the interlace level between portions of the image area which are spaced apart in the advanced direction of the print medium. Finally, when using an ink jet printer having both a tri-color printhead and a black printhead, it is known to print using one interlace level for the tri-color printhead and a different or no interlace level for the black printhead.

A selected one of a plurality of interlace levels may be used to effectively reduce a print artifact in a particular portion of an image area. For example, a 50% shingling technique (2 pass shingling) may be used to reduce a print artifact in one portion of the image area, while a 33% shingling technique (3 pass shingling) may be used to reduce a print artifact in a different part of the image area. Conventional methods of shingling would thus select the more restrictive 33% interlace level (3 pass shingling) for both portions of the image area so that all print artifacts are reduced. This may not be optimum from an efficiency stand point in terms of throughput of the printer.

What is needed in the art is a method of printing using a shingling technique which is more adaptable to using different interlace levels for different parts of the image area, while at the same time maximizing the throughput rate of the printer.

SUMMARY OF THE INVENTION

The present invention provides a method of shingled printing with a color ink jet printer in which an interlace level is assigned on a raster by raster basis for each separate color plane to be used during printing.

The invention comprises, in one form thereof, a method of printing an image on a print medium using an ink jet printer. The print medium is movable in an advance direction in the printer. An image area defined on the print medium includes a plurality of rasters extending in a direction transverse to the advance direction. The plurality of rasters are arranged sequentially adjacent to each other in the advance direction. A printhead includes a first array of ink jetting orifices and a second array of ink jetting orifices. Each of the first array and second array are configured for jetting a respective color ink onto the print medium. A plurality of first interlace levels associated with the first array of ink jetting orifices and a plurality of second interlace levels associated with the second array of ink jetting orifices are assigned to the plurality of rasters. Each of the first and second interlace levels are associated with only one of the rasters. The print medium is printed on in the plurality of rasters using the first array of ink jetting orifices with the first interlace levels, and the second array of ink jetting orifices with the second interlace levels.

An advantage of the present invention is that each raster in an image area is printed on with an interlace level for each separate color plane which is optimum for that raster.

Another advantage is that the print medium is advanced a distance corresponding to a most limiting interlace level for a given scan of the printhead, thereby optimizing the advance distance over multiple scans through a portion of the image area in the advance direction.

Yet another advantage is that the first bit mask to be used in a raster for a given interlace level is randomly selected, thereby reducing the occurrence of a print artifact in the image area.

A further advantage is that printing with a particular color plane in a given raster is delayed as long as possible between successive scans of the printhead, thereby reducing the occurrence of a print artifact in the image area.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 2 is a table illustrating independent interlace levels assigned to each raster in an image area using one embodiment of the method of the present invention;

FIG. 3 is a table illustrating examples of bit maps which may be used in conjunction with the interlace levels shown in FIG. 2.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
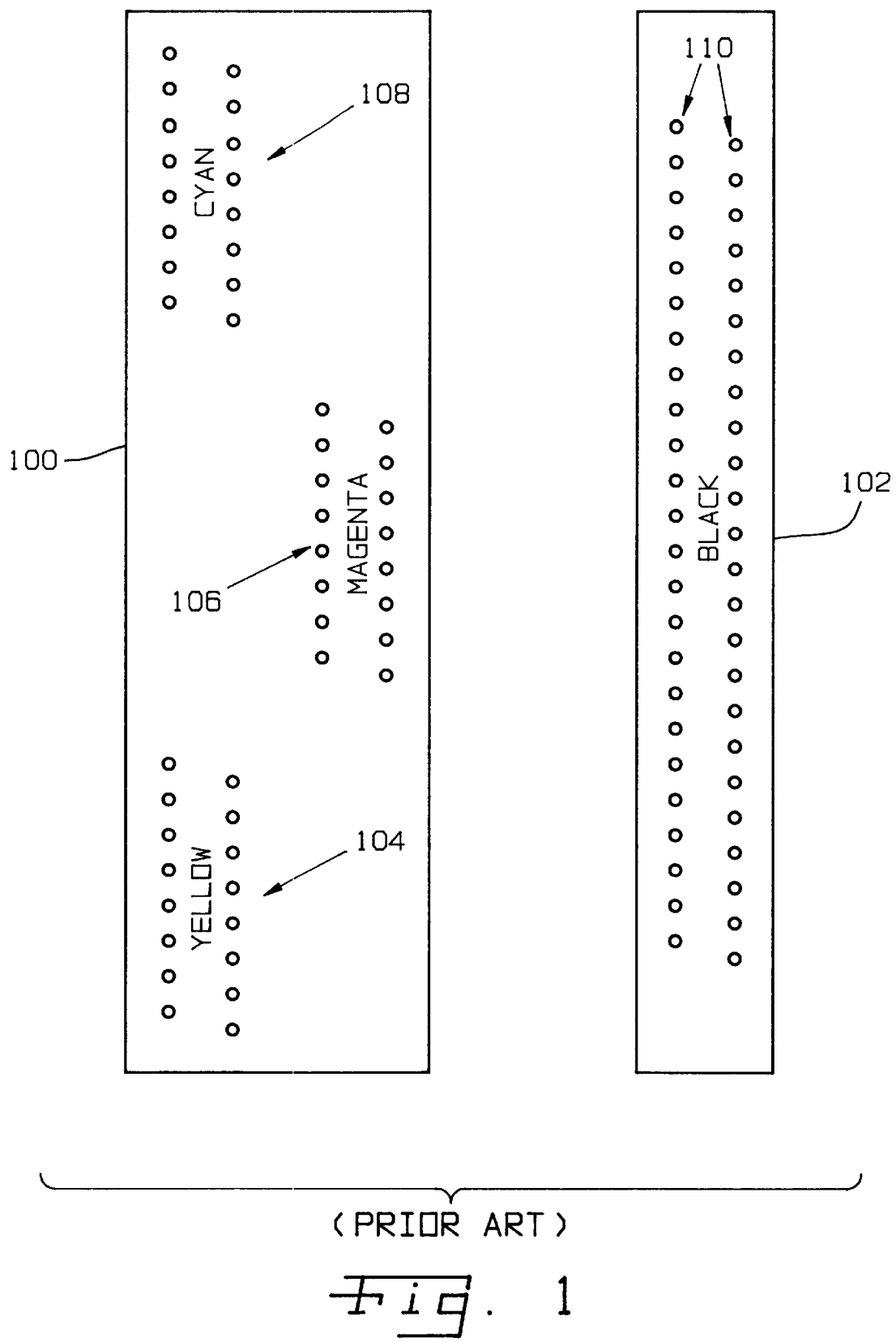
FIG. 1 is a schematic view of a conventional tri-color printhead and black printhead which may be used with the method of the present invention.

Referring now to the drawings, and more particularly to FIG. 1, there is shown an example of a conventional tri-color printhead 100 which may be used with the method of the present invention. Printhead 100 is typically mounted to and part of a color cartridge (not shown), which in turn is carried by a movable carriage assembly (not shown). Printhead 100 includes a plurality of ink jetting orifices 104, 106 and 108 for depositing three respective colors of ink on a print medium, such as paper. Ink jetting orifices 104 define a first array of ink jetting orifices from which a yellow ink may be jetted onto the print medium. Ink jetting orifices 106 define a second array of ink jetting orifices from which a magenta ink may be jetted onto the print medium. Ink jetting orifices 108 define a third array of ink jetting orifices from which a cyan ink may be jetted onto the print medium. Printhead 100 is therefore capable of jetting three primary color inks onto the print medium using yellow ink jetting orifices 104, magenta ink jetting orifices 106 and cyan ink jetting orifices 108.

In the particular embodiment shown in FIG. 1, yellow ink jetting orifices 104, magenta ink jetting orifices 106 and cyan ink jetting orifices 108 each include an array of sixteen (16) ink jetting orifices, with each array of ink jetting orifices being disposed in two vertical rows of eight (8) ink jetting orifices. Further, yellow ink jetting orifices 104, magenta ink jetting orifices 106 and cyan ink jetting orifices 108 are incorporated into a one-piece printhead. It should be appreciated, however, that printhead 100 may be constructed as a multiple-piece printhead, such as on a color cartridge having a three-piece printhead corresponding to each of the color ink jetting orifices 104, 106 and 108.

A black printhead 102 which may also be used with the method of the present invention is shown in FIG. 1 in relation to tri-color printhead 100. In the embodiment shown, black printhead 102 includes forty-eight ink jetting orifices 110 defining an array of ink jetting orifices. Ink jetting orifices 110 are configured to jet a single color ink, namely black ink, onto the print medium.

FIG. 2 is a table illustrating independent interlace levels for each separate color plane and ten rasters of an image area. The ten rasters may either be defined as the entire image area overlying the print medium, or only a portion of the image area overlying the print medium. Each of the plurality of rasters extends in a direction transverse to the advance direction corresponding to the scan direction of the printhead. The rasters are arranged sequentially adjacent to each other in the advance direction of the print medium. In the first raster of the image area (i.e. raster 1), the cyan color plane is assigned a 25% interlace level (4 pass), the magenta color plane is assigned a 50% interlace level (2 pass), and the yellow color plane is assigned a 100% interlace level (1 pass). The interlace level used during shingling, as defined herein, is a percentage of the total pixels in a given raster which are available for printing during a particular scan of the printhead. For example when shingling with a 25% interlace level (4 pass), only 25% of the pixels in a raster are available for printing during a scan of the printhead. Four scans of the printhead are thus required with a 25% interlace level in order to place all ink dots to be printed in the raster.

As is apparent from FIG. 2, the cyan, magenta and yellow color planes are each shingled on an independent basis for each separate raster in the image area overlying the print medium. Shingling on an independent basis for each raster line minimizes the formation of print artifacts and maximizes the throughput of the ink jet printer.

A plurality of first interlace levels associated with the first or yellow array of ink jetting orifices 104 are assigned to the ten rasters in the image area. For example, raster 1 is assigned a 100% interlace level (1 pass), raster 2 is assigned a 100% interlace level (1 pass), raster 3 is assigned a 25% interlace level (4 pass) and so on. Similarly, a plurality of second interlace levels associated with the second or magenta array of ink jetting orifices 106 are assigned to the ten rasters in the image area. For example, in the magenta color plane, raster 1 is assigned a 50% interlace level (2 pass), raster 2 is assigned a 100% interlace level (1 pass), raster 3 is assigned a 50% interlace level (2 pass) and so on. Likewise, a plurality of third interlace levels associated with the third or cyan array of ink jetting orifices 108 are assigned to the ten rasters in the image area. That is, in the cyan color plane, raster 1 is assigned a 25% interlace level (4 pass), raster 2 is assigned a 50% interlace level (2 pass), raster 3 is assigned a 100% interlace level (1 pass), etc. The plurality of first interlace levels, second interlace levels, and third interlace levels respectively assigned to the yellow, magenta and cyan color planes in rasters 1–10 may be assigned independently from one raster to another and from one color plane to another. That is, the interlace level in a given raster may be the same or different from one color plane to another (compare the different interlace levels between the cyan and magenta color planes in raster 1 with the same interlace levels between the cyan and magenta color planes in raster 4). Moreover, the interlace level for a single color plane may be the same or different from one raster to another (compare the different interlace levels in the cyan color plane between rasters 1 and 2 with the same interlace levels in the cyan color plane between rasters 3 and 4). The interlace levels for each color plane in each raster of the image area are thus assigned independently from each other.

FIG. 3 is a table illustrating examples of bit masks which may be used in conjunction with the independently assigned interlace levels shown in FIG. 2. For a 100% interlace level (1 pass), all of the ink dots to be printed must be placed in the raster during a single scan of the printhead. Accordingly, all of the pixels in the raster must be available for printing during the single scan of the printhead. Using a bit mask with an eight bit pattern as shown, all of the pixels in the raster are assigned a value of "1" indicating that all of the pixels are available for printing. If the image data sent from the host computer also indicates that an ink dot for a particular color plane is to be placed in a particular pixel in the raster, then the ink dot for that color plane will be placed during a single scan of the printhead. An ink dot will thus only be placed in a particular pixel of a raster if the bit mask is assigned a value of "1" for that pixel and the image data also indicates that an ink dot is to be placed in that pixel. A 100% interlace level is identified with the pattern name "SHINGLE 100_1".

For a 50% interlace level (2 pass) the ink dots for a particular color plane are placed in the pixels of a raster in two scans of the printhead across the print medium. During a first scan of the printhead, every other pixel in the raster is available for printing. Accordingly, every other bit in the bit mask is assigned a value of "1" as shown by the pattern "SHINGLE 50_1". During a second scan of the printhead, a complimentary every other pixel in the raster is available for printing. Thus, a complimentary every other bit in the bit mask is assigned a value of one as shown by the pattern "SHINGLE 50_2". Thus, for a given scan of the printhead, if the bit mask corresponding to a particular pixel is assigned a value of "1" and the image data also indicates that an ink dot is to be placed, then an ink dot for the associated color plane will be placed in the pixel of the raster.

For a 25% interlace level (4 pass), only 25% of the pixels in a raster are available for printing during a scan of the printhead across the print medium. Using a bit mask for a 25% interlace level with an eight bit pattern as shown, bits 1 and 5 for the first scan, 2 and 6 for the second scan, 3 and 7 for the third scan and 4 and 8 for the fourth scan are assigned a value of "1", indicating that the corresponding pixels in the raster are available for printing. Of course, using an eight bit pattern as shown, this pattern repeats across the width of the raster. That is, the bit mask assigned the pattern name "SHINGLE 25_1" used during a scan of the printhead repeats across the width of the raster.

Figure 4A:
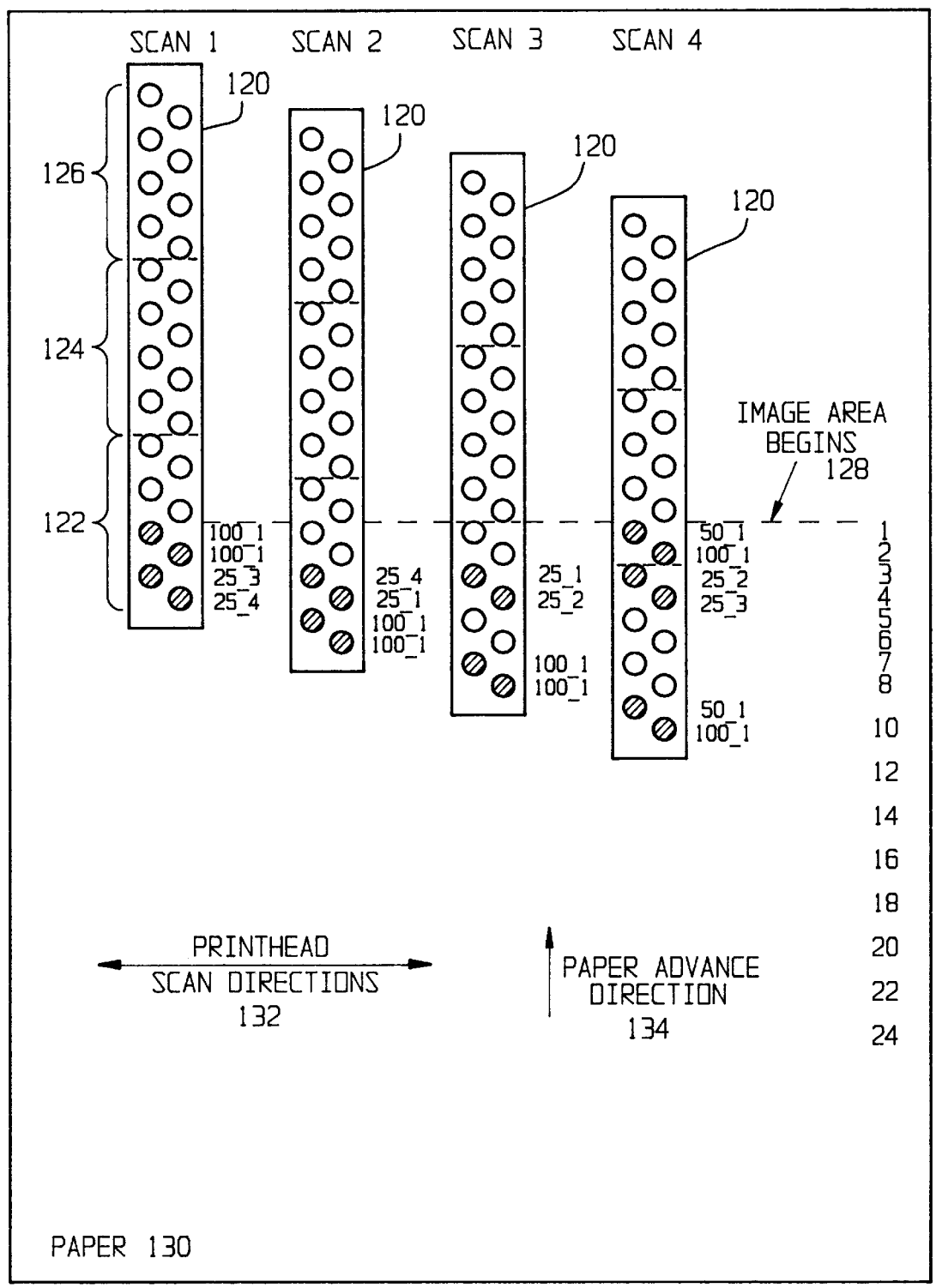
FIGS. 4A, 4B and 4C illustrate one embodiment of the method of printing of the present invention during successive scans of the printhead across the print medium.
Figure 4B:
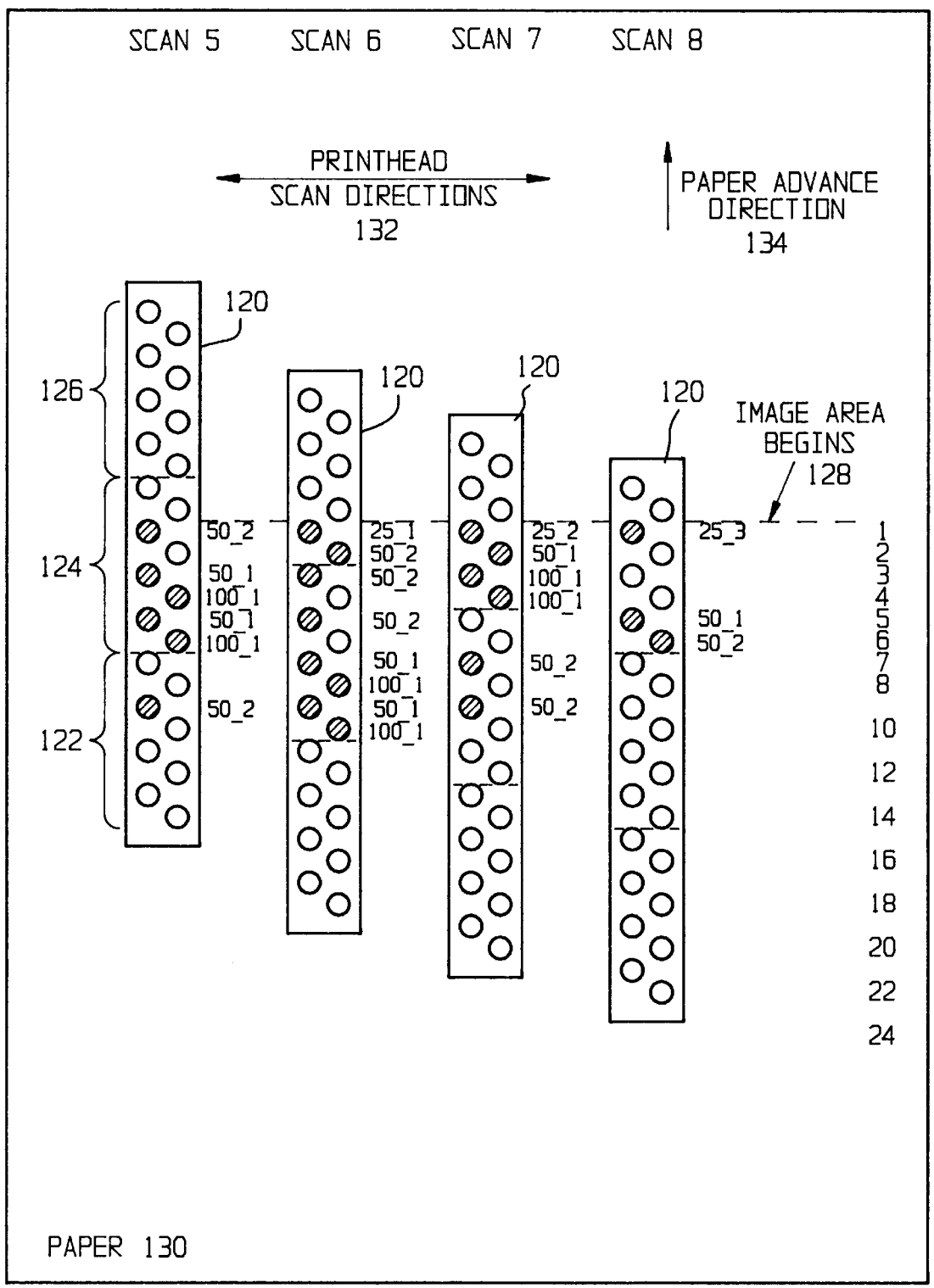
Figure 4C:
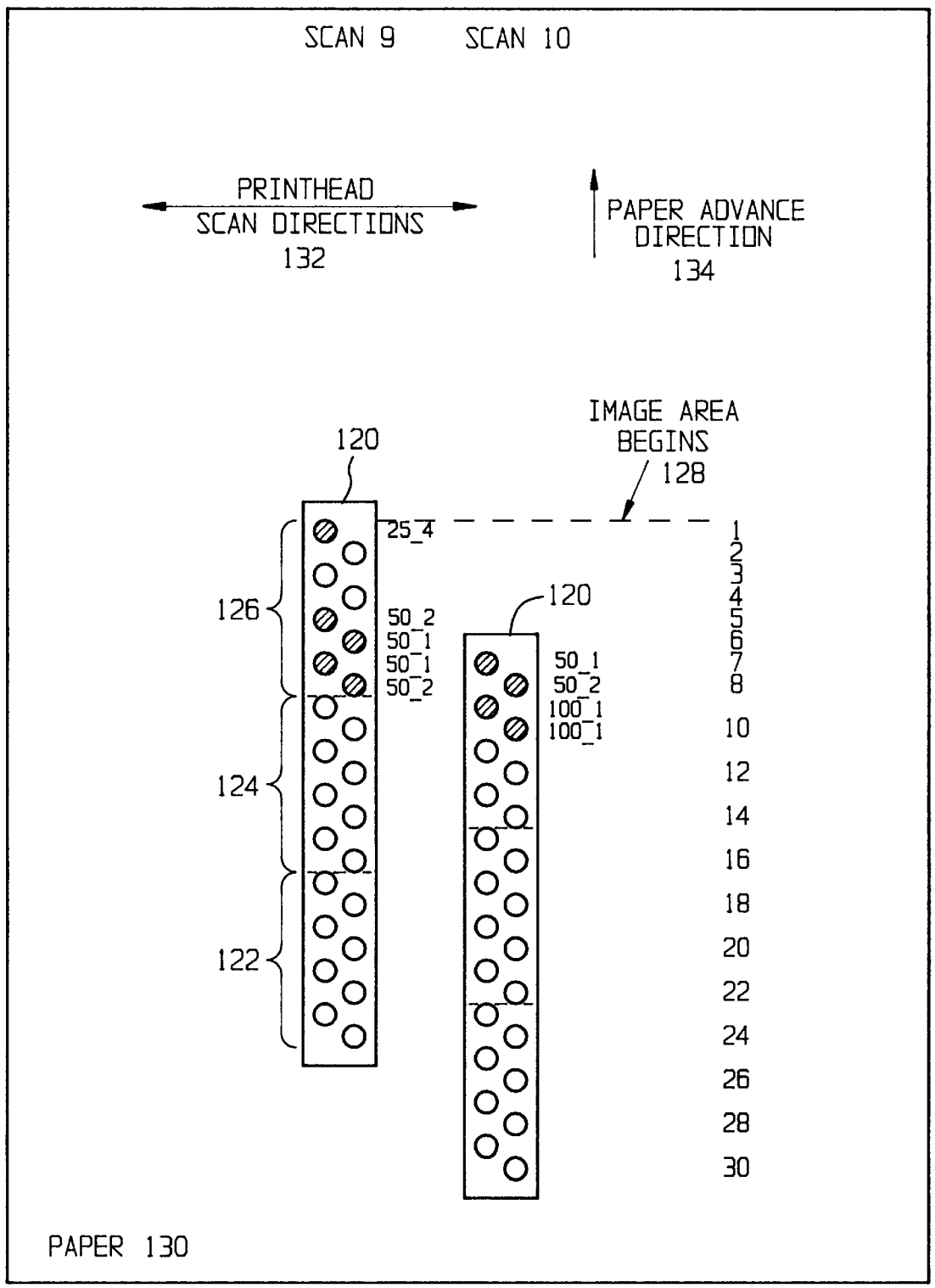

Referring now to FIGS. 4A, 4B and 4C, an embodiment of the method of printing of the present invention using independent shingling on a raster by raster basis will be described in further detail. The method as shown in FIGS. 4A–4C uses a printhead 120 which is similar to printhead 100 shown FIG. 1. Printhead 120 includes a first array of yellow ink jetting orifices 122, a second array of magenta ink jetting orifices 124 and a third array of cyan ink jetting orifices 126, similar to printhead 100 shown in FIG. 1. However, for purposes of simplicity, each of the first array 122, second array 124 and third array 126 only includes eight ink jetting orifices. Each of the first array 122, second array 124 and third array 126 are separated without a gap therebetween by a dashed line (not numbered) for visualization purposes. However, it will be appreciated that each of the first array 122, second array 124 and third array 126 may be separated from each other by a predetermined gap for manufacturing purposes, such as a center-to-center distance between a number of adjacent orifices. During a particular scan of the printhead, the ink jetting orifices which are used during that scan are indicated with cross hatching.

First, at least a portion of an image area 128 is defined on the print medium such as paper 130 to be printed on. Image area 128 includes a plurality of rasters 1–30 extending parallel to printhead scan directions 132 and transverse to paper advance direction 134. The plurality of rasters 1–30 are arranged sequentially adjacent to each other in the advance direction 134. Each raster 1–30 has a height in the advance direction 134 corresponding to the center-to-center distance between adjacent ink jetting orifices in the first array 122, second array 124 and third array 126. Each raster includes a plurality of pixels, in known matter, which extend in the transverse or scan directions 132. The pixels have a center-to-center distance in the transverse directions 132 which is usually the same as the height of each raster, but may be different depending upon the addressable resolution of a step motor which moves printhead 120 in transverse directions 132.

In the embodiment of the method shown in FIGS. 4A–4C, the shingle amount or interlace level for each raster is assigned using the interlace levels shown in FIG. 2. The successive scans of printhead 120 in FIGS. 4A–4C thus illustrate the ink jetting orifices of each array 122, 124 and 126 which are used during successive scans of printhead 120.

As paper 130 and defined image area 128 advance toward printhead 120, the first or yellow ink jetting orifices 122 advance into image area 128. Rasters 1 and 2 are each assigned a 100% interlace level (1 pass) for the yellow color plane and may thus be printed with a single pass of the printhead. Raster 3 is assigned a 25% interlace level (4 pass), indicating that raster 3 must be scanned four times with the yellow printhead using the four bit masks $25_{13}$ 1 through 25_4 shown in FIG. 2. Thus, the maximum amount that paper 130 can be advanced is such that raster 3 aligns with the second yellow ink jetting orifice so that in the next three scans of printhead 120, raster 3 will subsequently align with yellow ink jetting orifices 4, 6 and 8 in printhead 120. Similarly, raster 4 is assigned a 25% interlace level (four pass) indicating that raster 4 must be scanned four times with the first or yellow array of ink jetting orifices 122 using the four bit masks 25_1 through 25_4 shown in FIG. 3. Raster 4 thus aligns with the first yellow ink jetting orifice during SCAN 1 of printhead 120, and aligns with yellow orifices 3, 5 and 7 during SCANS 2–4 of printhead 120.

The method of the present invention maximizes the throughput rate of the printer by advancing paper 130 a maximum amount dependent upon the independently assigned interlace levels for any particular scan of printhead 120 across paper 130. That is, during SCAN 1 of printhead 120, it would be possible to align raster 3 with the first yellow orifice in the yellow array of ink jetting orifices 122. Raster 3 would then align with orifices 3, 5 and 7 during SCANS 2–4 of printhead 120. However, advancing paper 130 in this manner would not maximize the throughput rate of the ink jet printer. Rasters 1 and 2 are assigned a 100% interlace level (1 pass) and thus are printed in a single pass of printhead 120. Rasters 1 and 2 could thus be aligned with any orifice in the yellow array of ink jetting orifices 122. On the other hand, raster 3 is assigned a 25% interlace level and thus must be scanned four times with printhead 120 using bit mask 25_1 through 25_4 to place all of the ink dots in the pixels of raster 3. For a 25% interlace level, printhead 120 is advanced a distance corresponding to the height of two rasters (i.e., eight rasters/4 passes=advance distance of two orifices or rasters per pass), then the maximum amount paper 130 can be advanced prior to SCAN 1 is such that raster 3 aligns with the second orifice in the yellow array of ink jetting orifices 122. The 25% interlace level assigned to raster 3 thus is the most limiting interlace level used during SCAN 1. Paper 130 is therefore only moved in advance direction 134 an amount which is dependent upon the 25% interlace level of raster 3.

The corresponding pattern name of the bit mask which is used for a raster during SCAN 1 of printhead 120 is shown to the right of the corresponding ink jetting orifice of yellow array of ink jetting orifices 122. For rasters 3 and 4, rather than merely beginning with bit pattern 25_1 shown in FIG. 3, bit patterns 25_3 and 25_4 are respectively used for rasters 3 and 4. The first bit pattern which is used for a particular raster with the yellow, magenta or cyan color planes is randomly selected using a random seed or other method. For subsequent scans of the printhead, the other bit patterns for a given interlace level are then sequentially used. That is, if a 25% interlace level is assigned to a raster and bit pattern 25_1 is randomly selected during a first scan of the raster, then bit patterns 25_2 through 25_4 are used during the second, third and fourth scans across the raster. Likewise, if a 25% interlace level is assigned to a raster and bit pattern 25_3 is randomly selected for a first scan across the raster, then rasters 25_4, 25_1 and 25_2 are respectively used during the second, third and fourth scans across the raster. This method of randomizing the bit patterns used during successive scans of printhead 120 across a raster has been found to further reduce print artifacts generated on paper 130.

It is of course also possible to completely randomize the bit patterns which are to be used for a selected interlace level in a raster during successive scans of printhead 120. For example, if a raster is assigned a 25% interlace level, it is possible to randomly select one of the bit patterns 25_1 through 25_4 shown in FIG. 3 for each of the four successive scans of the printhead without using any bit pattern more than once. That is, bit patterns 25_1 through 25_4 may be randomly selected through four successive scans of printhead 120 through a raster such that bit pattern 25_2 is used during a first scan, bit pattern 25_3 is used during a second scan, bit pattern 25_1 is used during a third scan and bit pattern 25_4 is used during a fourth scan of printhead 120 across a raster.

Between SCAN 1 and SCAN 2, paper 130 is advanced a distance of two rasters corresponding to the most limiting interlace level associated with raster 3 in SCAN 1. Raster 3 thus aligns with the fourth orifice in the yellow array of ink jetting orifices 122. Rasters 1 and 2 are not printed on with the yellow color plane during SCAN 2 since these rasters were assigned a 100% interlace level (1 pass). Rasters 5 and 6 are each assigned a 100% interlace level for the yellow color plane. Thus, all ink dots for rasters 5 and 6 will be placed in the corresponding pixels during SCAN 2 using the first and second orifices of the yellow array of ink jetting orifices 122.

Between SCAN 2 and SCAN 3, paper 130 is again advanced a distance of two rasters corresponding to the most limiting interlace level associated with raster 3. Yellow ink dots are placed in rasters 3 and 4 during the third scan of printhead 120 using shingle patterns 25_1 and 25_2, respectively. Rasters 1, 2 and 5, 6 are not printed on during SCAN 3 since these rasters were assigned a 100% interlace level (1 pass) and printed during SCAN 1 and SCAN 2, respectively. Rasters 7 and 8 are assigned a 100% interlace level for the yellow color plane. Thus, all yellow ink dots will be placed in rasters 7 and 8 during SCAN 3 using shingle pattern 100_1.

Between SCAN 3 and SCAN 4, paper 130 is again advanced a distance of two rasters corresponding to the most limiting interlace level associated with raster 3. Raster 3 aligns with the last orifice in the yellow array of ink jetting orifices 22 during SCAN 4. Rasters 1 and 2 align with the first two orifices in the second or magenta array of ink jetting orifices 124. Raster 1 is assigned a 50% interlace level for the magenta color plane, and raster 2 is assigned a 100% interlace level for the magenta color plane. Thus, paper 130 can be moved a distance of four rasters with respect to the 50% interlace level assigned to raster 1 and can be moved a distance of eight rasters corresponding to the 100% interlace level assigned to raster 2. Likewise, raster 9 is assigned a 50% interlace level (2 pass) for the yellow color plane, and raster 10 is assigned a 100% interlace level (1 pass) for the yellow color plane. Paper 130 can thus be moved a distance of four rasters corresponding to the 50% interlace level assigned to raster 9, and can be moved a distance of eight rasters corresponding to the 100% interlace level assigned to raster 10. Paper 130 is therefore only advanced a distance of two rasters since raster 3 is assigned the most limiting interlace level.

Between SCAN 4 and SCAN 5, paper 130 is advanced a distance of four rasters such that raster 3 aligns with the fourth orifice in the magenta array of ink jetting orifices 124. Since a 50% interlace level requires two passes of printhead 120, and the printhead is advanced the distance of four rasters with a 50% interlace level, the maximum amount paper 130 can be advanced is such that raster 3 aligns with the fourth orifice in the magenta array of ink jetting orifices 124. Raster 3 will thus align with the last orifice in the magenta array of ink jetting orifices 124 after being advanced a distance of 4 rasters prior to SCAN 6 of printhead 120. Raster 1 is printed on using shingle pattern 50_1 in SCAN 5. Rasters 4 and 6 are assigned a 100% interlace level and are printed one using shingle pattern 100_1 with magenta array 124. Rasters 4 and 6 are not printed on again using the magenta color plane. Raster 5 is assigned a 50% interlace level (2 pass) and is printed on using shingle pattern 50_1. During a second and last scan of raster 9 using the yellow color plane, raster 9 aligns with the sixth orifice in the yellow array of ink jetting orifices 122 and shingle pattern 50_2 is used.

Between SCAN 5 and SCAN 6, paper 130 is advanced a distance of four rasters such that raster 3 aligns with the last orifice in the magenta array of ink jetting orifices 124. The interlace level assigned to raster 3 is thus the most limiting interlace level which determines the amount of movement of paper 130 in advance direction 134 between SCAN 5 and SCAN 6. Rasters 1 and 2 are now aligned with the first two orifices in the cyan array of ink jetting printers 126. Raster 1 is assigned a 25% interlace level (4 pass) and raster 2 is assigned a 50% interlace level (2 pass) for the cyan color plane. Raster 1 will thus align with orifices 4, 6 and 8 in the cyan array of ink jetting orifices during the next three scans of printhead 120 across paper 10. Rasters 3 and 5 receive the second and last placement of magenta ink dots using shingle pattern 50_2. Rasters 4 and 6 are not printed on with the magenta color plane since these rasters were assigned a 100% interlace level and were printed during SCAN 5. Rasters 7 and 9 are each assigned a 50% interlace level (2 pass) and rasters 8 and 10 are assigned a 100% interlace level (1 pass). The bit mask patterns 50_1 which are initially used for rasters 7 and 9 are again randomly selected as described above. Ink dots are placed in rasters 8 and 10 using bit mask pattern 100_1, and will not be printed on again using the magenta color plane. The yellow array of ink jetting orifices 122 has now moved beyond the ten rasters defined in the image area and will thus not be used again for placement of ink dots within rasters 1–10.

For remaining SCANS 7–10, the method of advancing paper 130 dependent upon a most limiting interlace level and printing with the bit mask associated with each independently assigned interlace level for each raster of the magenta and cyan color planes continues in the same manner as described above.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of printing an image on a print medium using a multi-color ink jet printer, the print medium being movable in an advance direction, said method comprising the steps of:

defining at least a portion of an image area on the print medium including a plurality of rasters extending in a direction transverse to the advance direction, said plurality of rasters arranged sequentially adjacent to each other in the advance direction;

providing at least one printhead including a first array of cyan ink jetting orifices, a second array of magenta ink jetting orifices and a third array of yellow ink jetting orifices, each of said first array, said second array and said third array being configured for respectively jetting a cyan, magenta and yellow ink onto the print medium;

assigning a first interlace level associated with said first array of ink jetting orifices to one of said plurality of rasters;

assigning a second interlace level associated with said second array of ink jetting orifices to said one raster;

assigning a third interlace level associated with said third array of ink jetting orifices to said one raster; and printing on the print medium in said one raster using each of said first array of ink jetting orifices with said first interlace level, said second array of ink jetting orifices with said second interlace level, and said third array of ink jetting orifices with said third interlace level;

wherein each of said first interlace level, said second interlace level and said third interlace level are assigned to said one raster independently from each other.

2. The method of printing of claim 1, wherein said at least one printhead comprises one printhead including each of said first array of ink jetting orifices, said second array of ink jetting orifices and said third array of ink jetting orifices.

3. The method of printing of claim 1, wherein said print medium comprises paper.

4. The method of printing of claim 1, wherein each of said first interlace level, said second interlace level and said third interlace level associated with said one raster are different from each other.

5. A method of printing an image on a print medium using a multi-color ink jet printer, the print medium being movable in an advance direction, said method comprising the steps of:

defining at least a portion of an image area on the print medium including a plurality of rasters extending in a direction transverse to the advance direction, said plurality of rasters arranged sequentially adjacent to each other in the advance direction;

providing at least one printhead including a first array of cyan ink jetting orifices, a second array of magenta ink jetting orifices and a third array of yellow ink jetting orifices, each of said first array, said second array and said third array being configured for respectively jetting a cyan, magenta and yellow ink onto the print medium;

assigning a first interlace level associated with said first array of ink jetting orifices to one of said plurality of rasters;

assigning a second interlace level associated with said second array of ink jetting orifices to said one raster;

assigning a third interlace level associated with said third array of ink jetting orifices to said one raster;

printing on the print medium in said one raster using each of said first array of ink jetting orifices with said first interlace level, said second array of ink jetting orifices with said second interlace level, and said third array of ink jetting orifices with said third interlace level, said printing step including the sub-step of scanning said printhead across said image area in said direction transverse to the advance direction;

determining which of said plurality of rasters will be printed in during a next scan of said printhead;

determining a most limiting interlace level from said plurality of first interlace levels, said plurality of second interlace levels and said plurality of third interlace levels for said rasters to be printed during said next scan; and moving the print medium in the advance direction an amount which is dependent upon said most limiting interlace level;

wherein each of said first interlace level, said second interlace level and said third interlace level are assigned to said one raster independently from each other.

6. A method of printing an image on a print medium using a multi-color ink jet printer, the print medium being movable in an advance direction, said method comprising the steps of:

defining at least a portion of an image area on the print medium including a plurality of rasters extending in a direction transverse to the advance direction, said plurality of rasters arranged sequentially adjacent to each other in the advance direction;

providing at least one printhead including a first array of cyan ink jetting orifices, a second array of magenta ink jetting orifices and a third array of yellow ink jetting orifices, each of said first array, said second array and said third array being configured for respectively jetting a cyan, magenta and yellow ink onto the print medium;

assigning a first interlace level associated with said first array of ink jetting orifices to one of said plurality of rasters;

assigning a second interlace level associated with said second array of ink jetting orifices to said one raster;

assigning a third interlace level associated with said third array of ink jetting orifices to said one raster;

printing on the print medium in said one raster using each of said first array of ink jetting orifices with said first interlace level, said second array of ink jetting orifices with said second interlace level, and said third array of ink jetting orifices with said third interlace level, said printing step including the sub-step of scanning said printhead across said image area in said direction transverse to the advance direction;

defining a plurality of bit masks being of a number associated with one of said plurality of said first interlace levels, said second interlace levels and said third interlace levels, said plurality of bit masks being used during successive scans of said printhead; and randomly selecting at least one of said bit masks for use during a corresponding one of said scans of said printhead;

wherein each of said first interlace level, said second interlace level and said third interlace level are assigned to said one raster independently from each other.

7. A method of printing an image on a print medium using an ink jet printer, the print medium being movable in an advance direction, said method comprising the steps of:

defining at least a portion of an image area on the print medium including a plurality of rasters extending in a direction transverse to the advance direction, said plurality of rasters arranged sequentially adjacent to each other in the advance direction;

providing at least one printhead including a first array of ink jetting orifices and a second array of ink jetting orifices, each of said first array and said second array configured for jetting a respective color ink onto the print medium;

independently assigning each of a plurality of first interlace levels associated with said first array of ink jetting orifices to a respective one of said plurality of rasters such that an optimal combination of print artifacts and printer throughput can be obtained;

independently assigning each of a plurality of second interlace levels associated with said second array of ink jetting orifices to a respective one of said plurality of rasters such that said optimal combination of print artifacts and printer throughout can be obtained; and printing on the print medium in said plurality of rasters using each of said first array of ink jetting orifices with said plurality of first interlace levels, and said second array of ink jetting orifices with said plurality of second interlace levels.

8. The method of printing of claim 7, wherein each of said plurality of first interlace levels and said plurality of second interlace levels comprise at least two of a 0% interlace level, a 25% interlace level, a 33% interlace level and a 50% interlace level.

9. The method of printing of claim 7, wherein said at least one printhead comprises one printhead including each of said first array of ink jetting orifices and said second array of ink jetting orifices.

10. The method of printing of claim 7, wherein said at least one printhead comprises one printhead including said first array of ink jetting orifices.

11. The method of printing of claim 7, wherein said printhead is movable across said image area in said direction transverse to the advance direction.

12. The method of printing of claim 7, wherein said print medium comprises paper.

13. The method of printing of claim 7, wherein said first array of ink jetting orifices is configured for jetting one of a cyan, magenta and yellow ink onto the print medium, and wherein said second array of ink jetting orifices is configured for jetting another of the cyan, magenta and yellow ink onto the print medium.

14. A method of printing an image on a print medium using an ink jet printer, the print medium being movable in an advance direction, said method comprising the steps of:

defining at least a portion of an image area on the print medium including a plurality of rasters extending in a direction transverse to the advance direction, said plurality of rasters arranged sequentially adjacent to each other in the advance direction;

providing at least one printhead including a first array of ink jetting orifices and a second array of ink jetting orifices, each of said first array and said second array configured for jetting a respective color ink onto the print medium;

assigning a plurality of first interlace levels associated with said first array of ink jetting orifices to said plurality of rasters, each of said plurality of first interlace levels being associated with only one of said rasters;

assigning a plurality of second interlace levels associated with said second array of ink jetting orifices to said plurality of rasters, each of said plurality of second interlace levels being associated with only one of said rasters;

printing on the print medium in said plurality of rasters using each of said first array of ink jetting orifices with said plurality of first interlace levels, and said second array of ink jetting orifices with said plurality of second interlace levels; said printing step including the substep of scanning said printhead across said image area in said direction transverse to the advance direction;

determining which of said plurality of rasters will be printed in during a next scan of said printhead;

determining a most limiting interlace level from said plurality of first interlace levels and said plurality of second interlace levels for said rasters to be printed on during said next scan; and moving the print medium in the advance direction an amount which is dependent upon said most limiting interlace level.

15. A method of printing an image on a print medium using an ink jet printer, the print medium being movable in an advance direction, said method comprising the steps of:

defining at least a portion of an image area on the print medium including a plurality of rasters extending in a direction transverse to the advance direction, said plurality of rasters arranged sequentially adjacent to each other in the advance direction;

providing at least one printhead including a first array of ink jetting orifices and a second array of ink jetting orifices, each of said first array and said second array configured for jetting a respective color ink onto the print medium;

assigning a plurality of first interlace levels associated with said first array of ink jetting orifices to said plurality of rasters, each of said plurality of first interlace levels being associated with only one of said rasters;

assigning a plurality of second interlace levels associated with said second array of ink jetting orifices to said plurality of rasters, each of said plurality of second interlace levels being associated with only one of said rasters;

printing on the print medium in said plurality of rasters using each of said first array of ink jetting orifices with said plurality of first interlace levels, and said second array of ink jetting orifices with said plurality of second interlace levels, said printing step including the sub-step of scanning said printhead across said image area in said direction transverse to the advance direction;

defining a plurality of bit masks being of a number associated with one of said plurality of interlace levels, said plurality of bit masks being used during successive scans of said printhead; and randomly selecting at least one of said bit masks for use during a corresponding one of said scans of said printhead.

16. A method of printing an image on a print medium using an ink jet printer, the print medium being movable in an advance direction, said method comprising the steps of:

defining at least a portion of an image area on the print medium including a plurality of rasters extending in a direction transverse to the advance direction, said plurality of rasters arranged sequentially adjacent to each other in the advance direction;

providing a printhead including an array of ink jetting orifices configured for jetting an ink onto the print medium;

independently assigning each of a plurality of interlace levels associated with said array of ink jetting orifices to a respective one of said plurality of rasters; and printing on the print medium in said plurality of rasters using said array of ink jetting orifices with said plurality of respective interlace levels.

17. The method of printing of claim 16, wherein said plurality of interlace levels comprise at least two of a 0% interlace level, a 25% interlace level, a 33% interlace level and a 50% interlace level.

* * * * *